FIG_7

United States Patent Office 3,310,149
Patented Mar. 21, 1967

3,310,149
CARTON TRANSFER APPARATUS
Leslie Vadas, Los Gatos, and Robert W. Drake, San Jose, Calif., assignors to FMC Corporation, San Jose, Calif., a corporation of Delaware
Filed June 20, 1966, Ser. No. 558,701
10 Claims. (Cl. 198—20)

The present invention pertains to carton forming and filling machines and more particularly relates to an apparatus for transferring cartons with their axes horizontal from an intermittently driven turret and placing the cartons with their axes vertical into carriers which are moving continuously along a single path.

In carton forming and filling machines of the type disclosed in copending application of Leslie Vadas et al., Ser. No. 461,738, which application was filed on June 7, 1965 and is assigned to the assignee of the present invention, an accumulator and cooperating transfer devices are disclosed for transferring cartons between spaced pairs of intermittently driven mandrels and carriers on a single continuously driven conveyor.

It has been determined that under certain operating conditions the accumulator is not necessary, and since it is possible for carton jams to occur within the accumulator, it is desirable to eliminate the accumulator from the machine when not necessary. In the above Vadas et al. apparatus the two rows of cartons received from the mandrels are retained in separate rows until they are placed on a dead plate above the single row of carriers thereby necessitating additional structure associated with mandrel stripping devices for moving the cartons in one row farther than the cartons in the other row. Also, the transfer devices in the above-mentioned application did not grip the cartons but allowed each carton to gravitate onto a dead plate, and while in a first stationary position to be engaged by a reciprocating arm and be abruptly pushed into another stationary position in the path of movement of relatively fast moving transfer fingers which abruptly engaged the cartons with such force as to sometimes cause the cartons to topple over thereby causing a carton jam.

The carton transfer apparatus of the present invention is adapted for use in the above mentioned Vadas et al. machine in place of the accumulator and associated transfer devices disclosed therein. The carton transfer apparatus includes a single transfer conveyor which receives the cartons from both rows and thereafter transfers the cartons into position to be engaged by the transfer finger while moving in the same direction as the transfer fingers. Accordingly, the transfer apparatus of the present invention reduces the expense of the transfer structure while reliably performing the transfer operation. The carton transfer apparatus is also arranged to selectively handle quart, pint, one-third quart or one-half pint size cartons, it being understood that all of the cartons have the same cross-sectional dimensions and vary only in length.

It is, therefore, one object of the present invention to provide an apparatus for transferring cartons from intermittently driven mandrels into carriers of a continuously driven conveyor.

Another object is to provide an apparatus for gripping cartons from two rows with their axes horizontal and for releasing the grip on the cartons only after the cartons have been shifted to vertical positions and have been transferred into positions to be engaged by transfer fingers moving in the same direction as the cartons and disposed above and in alignment with spaced carriers that are continuously moving along a single path.

Another object is to provide a transfer apparatus having a continuously driven conveyor arranged to be flexed in two planes which are perpendicular to each other.

Another object is to provide a transfer apparatus which includes a transfer conveyor moving along a linear path at one speed and tangent to the arcuate path of a transport conveyor having carriers thereon and moving at another speed, and wherein the cartons are transferred from the transfer conveyor to the carriers at the point of tangency.

Another object is to provide a transfer apparatus ararnged to receive pairs of horizontal cartons spaced a predetermined distance apart and to shift the cartons to vertical positions and place them into continuously moving carriers spaced a different distance apart.

Another object is to provide apparatus for reliably transferring cartons of different heights from a pair of mandrels into carriers of a single conveyor.

These and other objects and advantages of the present invention will become apparent from the following description and the accompanying drawings in which.

In general, the direct transfer apparatus 20 (FIGS. 1 to 3) of the present invention comprises an intermittently driven bottom forming turret 22 having an upper series 24 and a lower series 26 of equally spaced, radially extending mandrels 28, which series of mandrels are vertically spaced a predetermined distance apart, the preferred center-to-center distance being six inches. The bottom forming turret 22 intermittently advances pairs of cartons C into a mandrel unloading station 30 where a mandrel stripping or unloading mechanism 32 strips the cartons from the mandrels and places them into upper and lower troughs 34. A power actuated pusher 36 then pushes two horizontally disposed cartons at a time off the troughs 34 and into the transfer jaws 38 of a continuously driven transfer conveyor 40. The jaws are preferably spaced six inches apart and include carton gripping fingers 42 which resiliently grip the cartons in their jaws and advance them along a circuitous path while turning them into upright positions. The circuitous path includes an arcuate portion 43 (FIG. 1) having a linear portion 44 extending therefrom which linear portion is tangent to the path of movement of a transport conveyor 46 as the transport conveyor moves around an arcuate portion which is concentric with the axis of a top crimping turret 48. The transport conveyor 46 has a plurality of spaced carriers 50 mounted thereon and spaced apart a distance which is different from that of the jaws 38, the preferred distance being ten inches.

At the point of tangency of the two conveyors, each jaw 38 moves a carton onto a dead plate 51 directly above the associated carrier 50 and against upper transfer fingers 52 and lower fingers 52a of the crimping turret 48. The associated gripping finger 42 is then immediately opened to release the carton so that the transfer fingers 52, which are moving slightly faster than the jaws 38, can gently gain control of the carton and move it away from the transfer jaws. Since the spacing of the jaws is approximately 6 inches and the spacing of the carriers, approximately ten inches, in the preferred embodiment, it will be appreciated that the drive mechanism to be described later is arranged to drive the transport conveyor ten inches while the transfer conveyor moves only six inches. After the cartons are gently moved by the transfer fingers 52 to the end of the dead plate, they are pushed downwardly one at a time into the carriers 50 of the conveyor 46, by one of a plurality of crimping heads 54 which is lowered into the open top closure of each carton to crimp opposed tabs of the top closure outwardly and to stabilize and center the upper end of the carton.

More particularly, the mandrel stripping or unloading mechanism 32, which is substantially the same as that disclosed in the Vadas et al. application, strips two cartons at a time from the mandrels 28 at the mandrel unloading station 30. The mechanism 32 is mounted on a stationary frame 60 and comprises a mandrel unloading carrier 61 (FIGS. 1, 2 and 3) which is slidably mounted on a shaft 63. The shaft 63 is supported a short distance above the stationary frame 60 on pedestals 64 and 66, the pedestal 66 being disposed below the path of movement of the mandrels 28. The carrier 61 is held from rotation about the shaft 63 by a cam follower 67 (FIG. 3) journalled thereon and slidably received in a horizontal cam track 72 supported on the frame 60.

Figure 3:
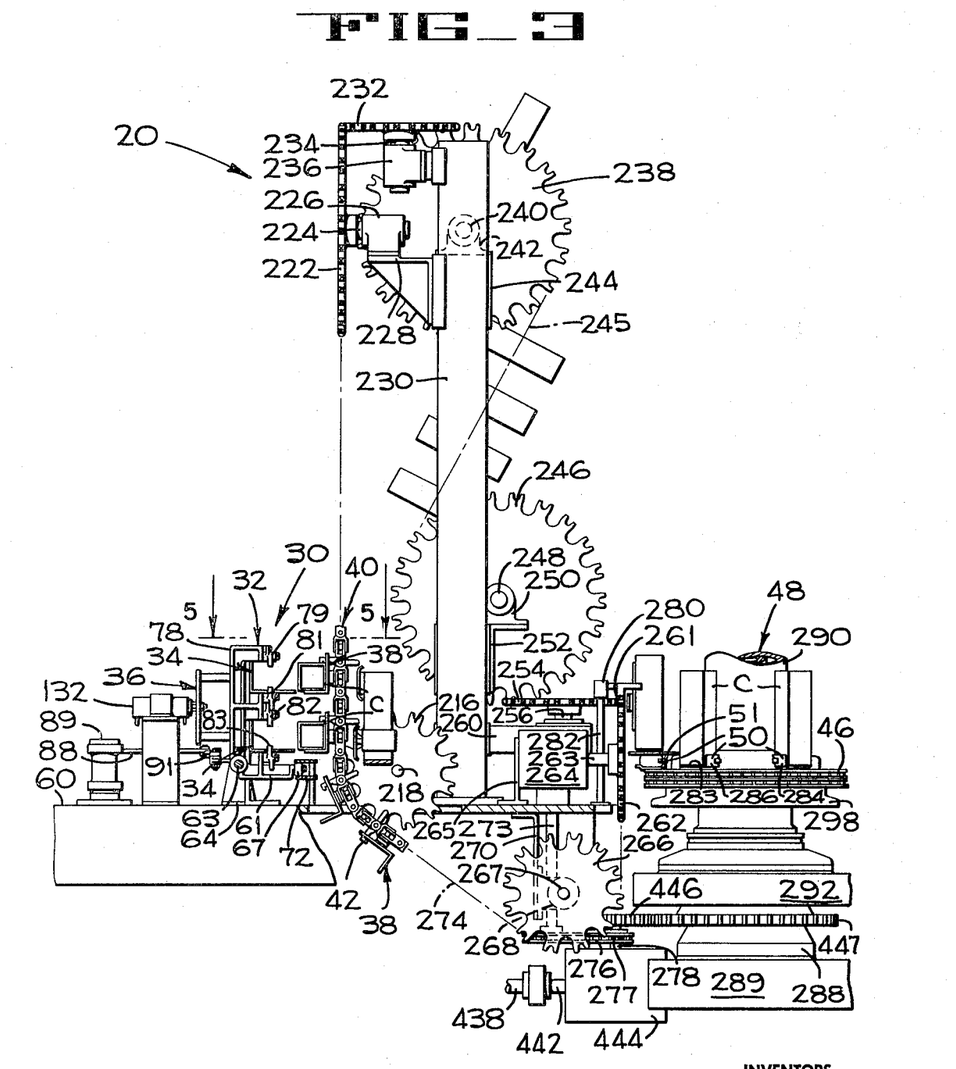
FIGURE 3 is an elevation of a portion of the apparatus looking in the direction of arrows 3—3 of FIGURE 1.

The mandrel unloading carrier 61 is generally L-shaped as viewed in FIGURE 3 and includes a vertically extending arm 78 projecting upwardly from the shaft 63. Four carton engaging stripper fingers 79, 81, 82 and 83 are pivotally mounted on the vertical arm 78, the fingers 79 and 81 cooperating to strip cartons from the particular upper mandrel 28 which is indexed at the mandrel unloading station 30, and the fingers 82 and 83 cooperating to strip the cartons from each lower mandrel 28 when at the unloading station. The pairs of fingers 79, 81 and 82, 83 are resiliently urged toward the center of the associated cartons.

Since the stripping fingers are identical to those described in the aforementioned Vadas et al. application, reference may be had to said application if a more complete description of the fingers is desired. It will suffice to say that when each set of stripper fingers are moving toward the bottom forming turret 22, the fingers pivot outwardly of opposed walls of the associated carton and slide over said opposed walls until they move past the open end of the carton at which time they snap into position to engage the adjacent edges of the top closure of the carton. Thereafter, when the carrier 61 is moved radially outward of the bottom forming turret 22, the fingers engage the cartons and strip them from the mandrels for acceptance by the associated troughs 34.

In order to reciprocate the carrier 61, a carrier actuating arm 88 (FIG. 1) is rigidly secured to the upper end of a vertical pivot shaft 89 which is journalled in the frame 60 and is pivoted by means to be described hereinafter. Since the carrier must be selectively positioned to strip cartons of different lengths from the mandrels, one end of a link 91 is pivotally connected to the carrier 61 and its other end is pivotally connected to a first yoke 92 on the end of the carrier actuating arm 88 by a pin 93 when quart size cartons C are being handled. When pint carton C1 (FIG. 6), one-third quart cartons C2, and one-half pint size cartons C3 are being handled, the pin 93 is inserted in the holes 94, 96 and 97, respectively, formed in a second yoke 98 welded to the arm 88. The shaft 89 is pivoted through a predetermined arcuate range in timed relation with the intermittent movement of the bottom forming turret 22, and with the continuous movement of the transfer conveyor 40, transport conveyor 46, and top crimping turret 48 by drive means subsequently to be described.

The upper and lower troughs 34 (FIGS. 4, 5 and 6) are identical and each trough includes a generally L-shaped carton receiving body 100 which has a vertical wall 101 rigidly secured on a bracket 102, and a horizontal wall 103 disposed in position to receive the associated carton. It will be noted that the side edge of each horizontal wall is disposed closely adjacent the path of movement of the transfer conveyor 40, and that the forward edge of each horizontal wall 103 is slotted at 104 to receive the associated lower stripping finger when in the fully retracted position.

Figure 6:
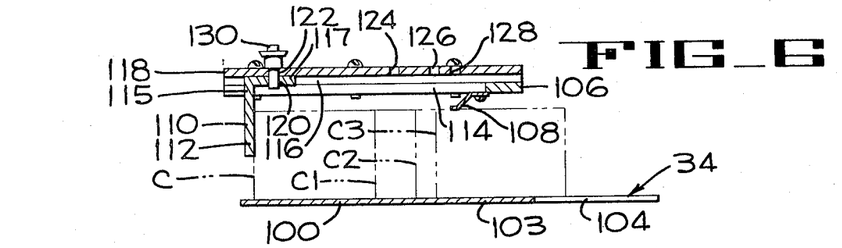
FIGURE 6 is a vertical section taken along lines 6—6 of FIGURE 5 through one of the troughs illustrating the carton stop and the means for adjusting the stop in position to accommodate cartons of different sizes.

In order to retain the control of the cartons and to hold the cartons in proper position in the troughs 34, an angle bar 106 is associated with each trough and is secured to the bracket 102. A leaf spring 108 is secured to each bar 106 and bears against the upper surface of the associated carton. The leaf spring cooperates with an adjustable stop finger 110. Each finger 110 includes a vertical portion 112 with a narrow neck 115 that extends through a slot 114 in the angle bar 106 and is disposed in position to engage the bottom of the associated carton. Horizontal portion 117 (FIG. 6) of the finger is slidably received in a slide way 116 defined by a bar 118 bolted to the angle bar 106. As indicated in FIGURE 6, the horizontal portion 117 of the figure has a hole 120 therein which is selectively aligned and locked in registration with one of four holes 122, 124, 126 and 128 in the bar 118 by a quick release pin 130 thereby adjusting the stop finger 110 to accommodate quart, pint, one-third quart, and one-half pint size cartons, respectively.

A hydraulic power unit 132 (FIG. 4) is provided and is operated in timed relation with the movement of the transport conveyor 40 for simultaneously pushing a pair of cartons out of the troughs 34 and into adjacent ones of the transfer jaws 38. The cylinder 134 of the power unit 132 is bolted to a bracket 136 and has its piston rod 135 bolted to a pusher bar 138. The pusher bar has stub shafts 140 secured to opposite ends thereof and journalled in suitably bushed holes in the bracket 102. A flat pusher plate 142 is secured to the other end of each shaft 140 in position to engage and simultaneously push a pair of cartons laterally of the troughs 34 and into continuously moving jaws 38 of the transfer conveyor 40.

The power unit is operated in timed relation with the movement of the transfer conveyor 40 by a valve 144 which includes a core 146 slidably received in a valve body 148 and normally urged toward one end of the body by a spring 150. When the core 146 is at said one end of the body, high pressure hydraulic pressure fluid from a pump (not shown) is directed through a conduit 152, through a straight passage 153 in the core 146, and through a conduit 154 into the cylinder 134 adjacent the free end of the piston rod 135 thereby holding the piston in a retracted position. The low pressure fluid flows from the other end of the cylinder through a conduit 156, a straight passage 158 in the core, and is returned to the suction side of the pump (not shown) by conduit 160.

A valve stem 162 secured to the core 146 projects through the body 148 and has a combination gate opening and valve actuating cam 164 secured thereto. As will be described in more detail later, alternate ones of the carton gripping fingers 42, i.e., the fingers associated with the jaws 38 which are loaded with cartons pushed out of the lower jaws 34, contact and are gripped by the cam 164 and also push the core 146 to the other end of its stroke. Hydraulic fluid under high pressure is then directed from the conduit 152 through a cross passage 166 in the core through the conduit 156 into the closed end of the cylinder thereby causing the piston rod and pusher plates 142 to push the cartons from both troughs into the two adjacent transfer jaws 38. The hydraulic fluid on the other side of the piston is returned to the suction of the pump through the conduit 154, a cross passage 168 in the core 134, and the conduit 160. Speed control valves 170, such as needle valves, may be inserted in the conduits 154 and 156 so as to accurately control the rate of movement of the piston rod 135.

Figure 4:
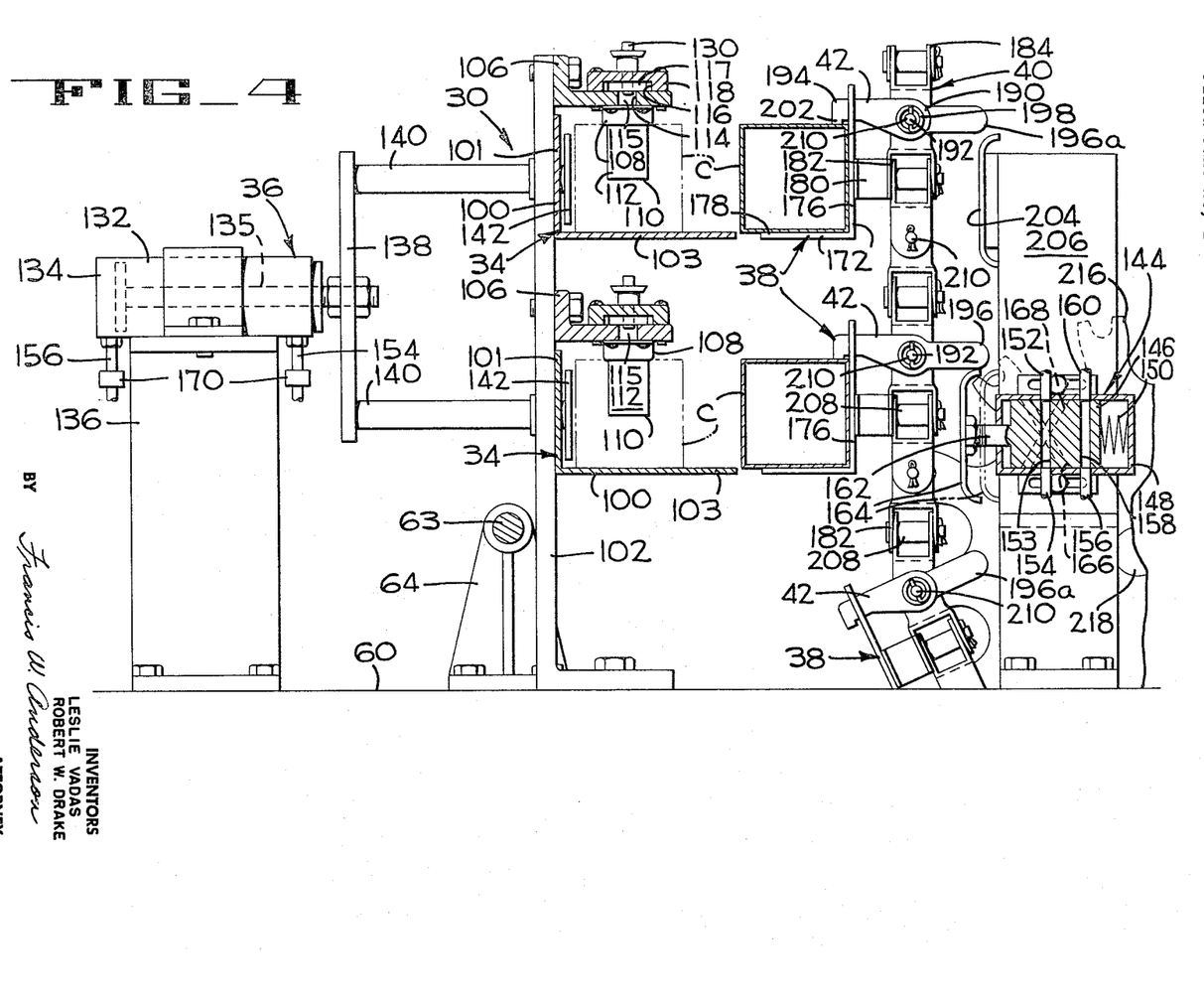
FIGURE 4 is an enlarged vertical section taken along lines 4—4 of FIGURE 1 illustrating two transfer jaws at the loading station and the mechanism for opening the jaws and actuating a carton pusher.
Figure 5:
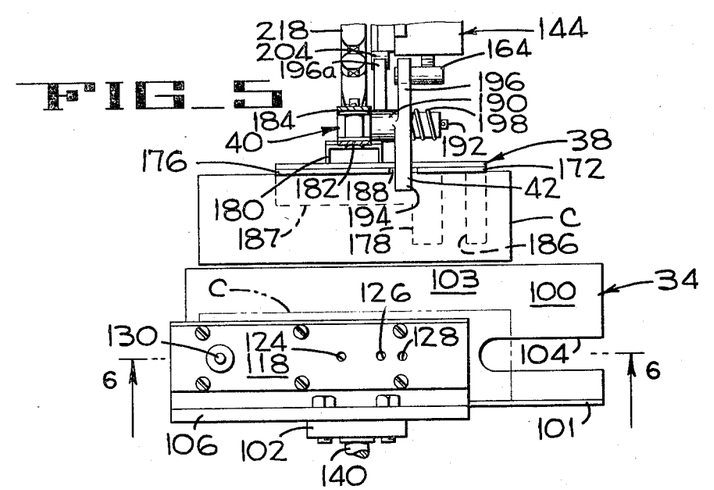
FIGURE 5 is an enlarged horizontal section taken along lines 5—5 of FIGURE 3 illustrating the offset of alternate jaw actuating arms and the means for opening the jaws at the mandrel unloading station.

As indicated in FIGURES 4 and 5, the transfer jaws 38 are similar to each other and each jaw comprises an angle body 172 having a first wall 176 extending parallel to the path of movement of the transfer conveyor 40 and a second wall 178 normal to the wall 176. The wall 176 is rigidly secured to a spacer 180 which in turn is rigidly secured to a link 182 of the chain 184 of the conveyor 40, as by bolting. As indicated in FIGURE 5, the wall 178 has a slot 186 therein through which one of the transfer fingers 52 of the forming turret passes during transfer of each carton from a transfer jaw 38 onto the dead plate 51 above the carriers 50. The wall 178 is also relieved as at 187 near its left end as clearly illustrated in FIGURE 5.

The wall 176 has a slot 188 formed therein through which one end of the associated carton gripping finger 42 projects and abuts when no carton is present in the jaw. Each finger 42 comprises a hub 190 which is pivotally mounted on the extension 192 of one of the pivot pins of the chain 184 and has a carton gripping arm 194 and an actuating arm 196 projecting outwardly therefrom in opposite directions. A torsion spring 198 is wound around each hub 190 and has one end secured to a hole in the pin 192 and the other end secured to the hub 190 so as to urge the finger in a counterclockwise direction as viewed in FIGURE 4 when at the mandrel unloading station 30. When a carton is pressed in the transfer jaw it will be apparent that the gripping arm 194 which has a hooked end portion 202, is moved into resilient gripping engagement with the carton. When a carton is not present in the jaws and the actuating arm 196 is not being contacted to hold the jaws open, it will be apparent that the arm 194 abuts against one wall of the slot 188 to limit the amount of counterclockwise movement permitted the finger 42.

As mentioned previously, the core 146 of the valve is shifted by engagement of every other gripping finger 42 with the cam 164. In this regard, it will be noted that the actuating arms 196 (FIG. 5) of alternate fingers are offset from each other so that only the arms 196 of the fingers 42 which are to be opened to receive cartons from the lower troughs will contact the cam 164, while the actuating arms 196a of the other fingers 42 will contact a stationary cam 204 thereby opening these fingers so as to receive cartons from the upper trough 34. As best shown in FIGURE 4, the cam 204 and the valve 144 are rigidly secured to a bracket 206 which is bolted to the frame 60.

An important feature of the invention is that the transfer conveyor 40 is adapted to carry a series of jaws 38 with cartons clamped therein around a circuitous path and into tangential relationship with the transport conveyor 46 without releasing their grip on the cartons, and while shifting the cartons from positions wherein their axes are horizontal to positions wherein their axes are vertical. In order to accomplish the above, the conveyor chain 184 is of special design and has each link 182 (FIG. 4) pivotally inter-connected to adjacent links by pivot pins 208 and 210, which pins 208 are disposed normal to a plane in which the other pivot pins 210 lie. It will be noted that the pivot pin extension 192 upon which the jaws 194 are mounted are extensions of the pivot pins 210.

As shown in FIGURE 4, when the chain is moving along a linear path the pivot pins 208 are perpendicular to the first walls 176 of the jaws, while the pins 210 are parallel to said first walls 176. Thus, it will be apparent that the conveyor chain 184, and accordingly the transport jaws 38, are ararnged to be pivoted into planes which are perpendicular to each other.

The transfer conveyor 40 (FIGS. 1, 2 and 3) is trained around an idler sprocket 216 which lies in a vertical plane adjacent the mandrel unloading station 30, which sprocket is keyed to a shaft 218 journalled in a bearing 220 bolted to the frame 60. The conveyor then engages an upper sprocket 222 which rotates in a vertical plane at 90 degrees the sprocket 216 and is keyed to a shaft 224 which is journalled in a bearing 226 that is secured to a bracket 228 bolted to a vertical post 230 adjacent its upper end, which post is bolted at its lower end to the frame 60. The conveyor 40 is then trained around a sprocket 232 which lies in a horizontal plane and is keyed to a shaft 234 which is journalled in a bearing 236 bolted to a bracket secured to the upper end of the post 230. The conveyor is then trained around a large diameter upper sprocket 238 which lies in a vertical plane normal to the plane of the sprocket 222 and 232, and is keyed to a shaft 240 journalled in a bearing 242 that is bolted to a bracket 244 secured to the post.

Figure 1:
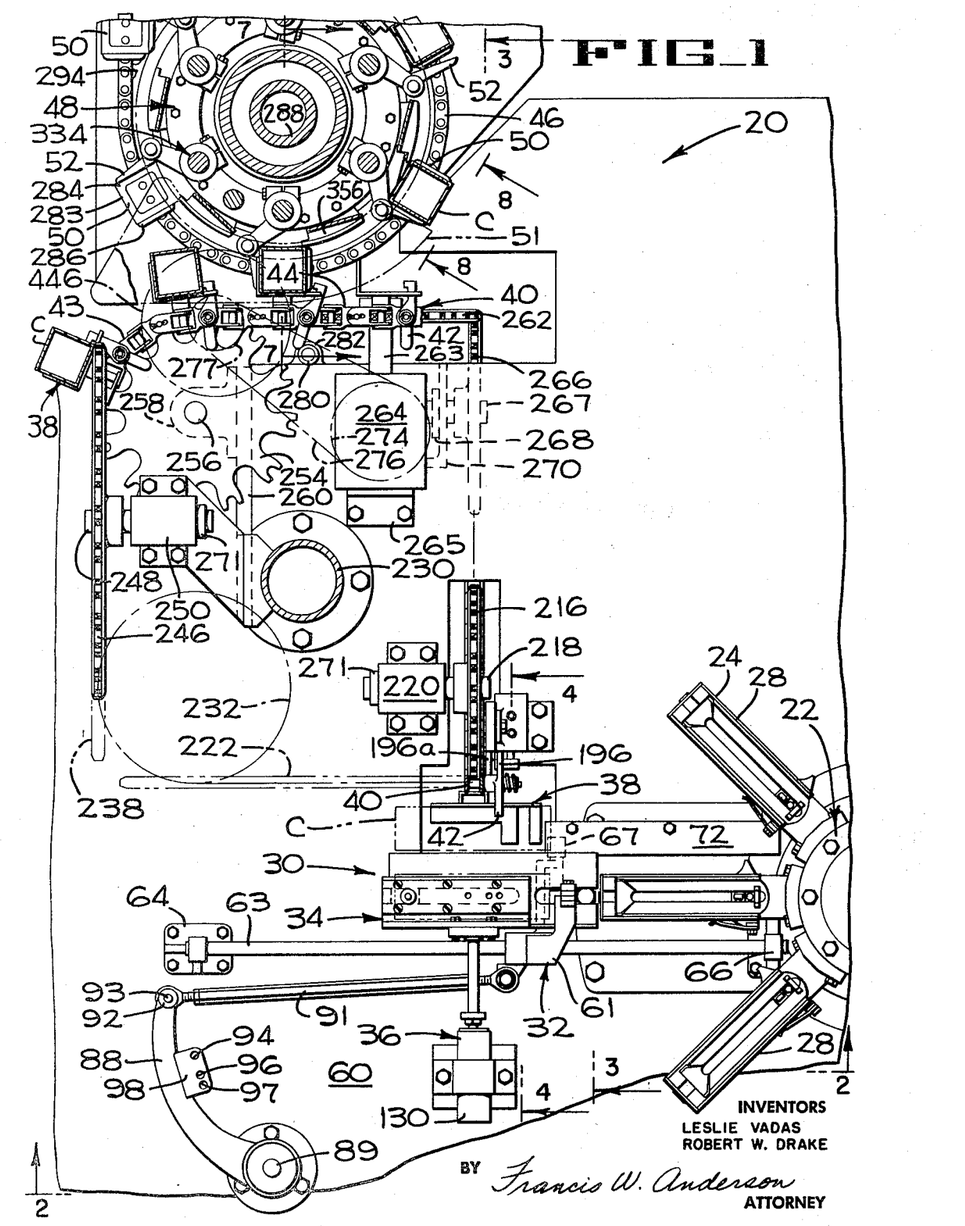
FIGURE 1 is a horizontal section taken substantially along the lines 1—1 of FIGURE 2 illustrating a portion of the transfer mechanism of the present invention, certain sprockets above the plane of section being shown in phantom.
Figure 2:
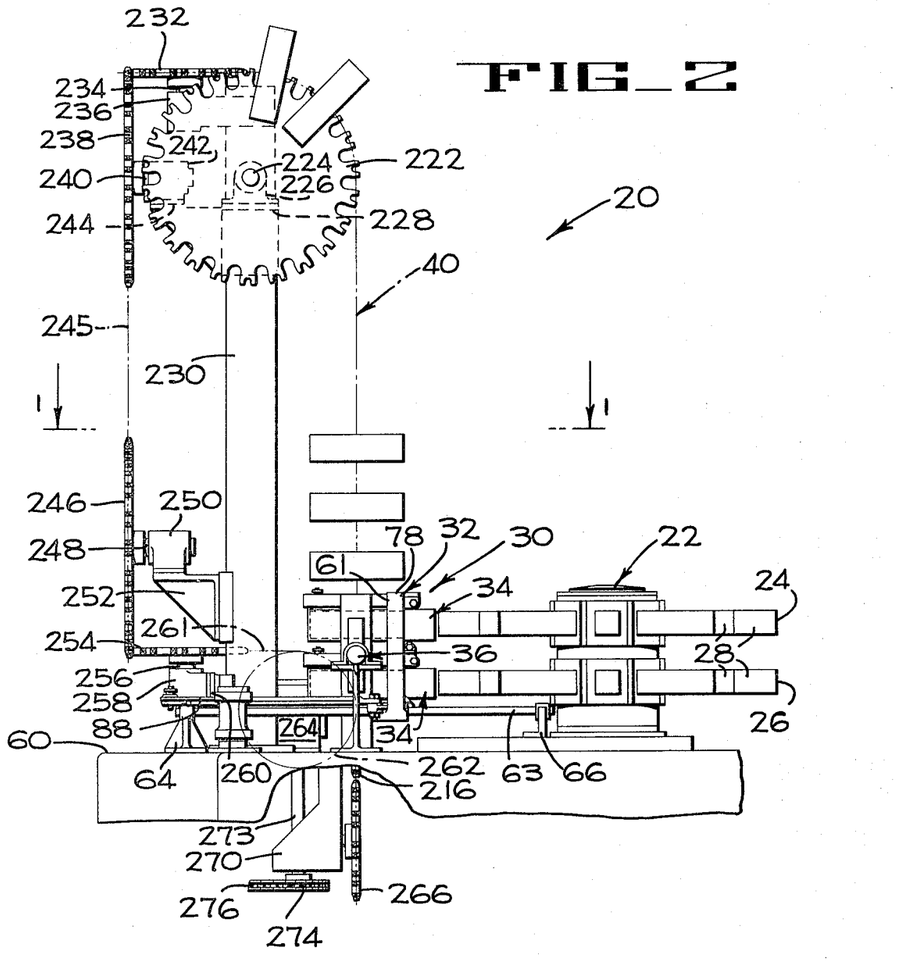
FIGURE 2 is a side elevation looking in the direction of arrows 2—2 of FIGURE 1.

The conveyor then moves downwardly along an inclined path 245 wherein the cartons may be subjected to sterilizing means such as ultra violet lights (not shown) and is trained around a sprocket 246 lying in the vertical plane of sprocket 238. The sprocket 246 is keyed to a shaft 248 which is journalled in a bearing 250 that is bolted to a bracket 252 which is, in turn, bolted to the post. The conveyor 40 then moves around a horizontal sprocket 254 which is keyed to a shaft 256 that is journalled in a bearing 258 bolted to an arm 260 which is in turn bolted to the post. As shown in FIGURE 1, when the transfer jaws 38 move around the sprocket 254 they support the carton in vertical positions. The conveyor then moves along a linear path 261 which is tangent to but above the path of movement of the carriers 50 permitting the carton to move over the dead plate 51, and upon reaching the point of tangency the carton gripping fingers 42 are opened thereby releasing the cartons for gravitation onto the dead plate 51.

The conveyor 40 with the empty transfer jaws 38 thereon then moves around the upper portion of a drive sprocket 262 which is keyed to the horizontal output shaft 263 of a right angle gear box 264 that is bolted to a bracket 265 which is secured to the frame 60. An idler sprocket 266 disposed below and at right angles to the drive sprocket 262 then receives the conveyor and returns the endless conveyor 40 to the sprocket 216 which is coplanar with sprocket 266. The sprocket 266 is keyed to a shaft 267 journalled in a bearing 268 that is bolted to a bracket 270 secured to the lower surface of the frame 60, as by bolting. Collars 271 or the like are secured on the above mentioned shafts for preventing axial movement of the shafts relative to the associated bearings.

The gear box 264 has a vertically downward extending input shaft 273 to which a sprocket 274 is keyed. A drive chain 276 is trained around the sprocket 274 and around a sprocket 277 which is keyed to a vertical shaft 278 journalled on the frame 60 and driven by means to be described hereinafter.

As mentioned above, the carton gripping finger 42 of each transfer jaw 38 is opened to release the carton therein onto the dead plate 51 above the associated carrier 50 when the carrier and the jaw reach the point of tangency of the linear path 261 with the arcuate path of movement of the transpart conveyor 46 around the top crimping turret 48. The jaws are opened by engagement of the associated actuating arms 196 or 196a of the associated finger 42 with a roller 280 which is journalled on the upper end of a bracket 282 secured to the frame 60.

The carriers 50 are all identical and are spaced at equal intervals along the transport conveyor 46, the preferred center to center spacing being ten inches. Each carrier comprises a carton supporting floor 283 (FIGS. 1, 3 and 8) having three walls 284, 285 and 286 formed integrally therewith and projecting upwardly therefrom. The other or radially outward, side of the carrier is open.

The crimping turret 48 (FIGS. 1, 3 and 7) is identical to that disclosed in the aforementioned Vadas et al. application and comprises a stationary vertical column 288 which is bolted to a stationary frame 289, and a tubular drive column 290 journaled on the stationary column 288. A vertically adjustable frame 292 encompasses the column 290 and is vertically adjusted by a plurality of hydraulic jacks 293 (only one jack being shown), as fully disclosed in the Vadas et al. application so as to adapt the turret 48 to handle cartons of different sizes. A transport conveyor drive sprocket 294, and a splash apron 298 are bolted to a drive hub 301 which is slidably received on the rotatable column 290. The hub 301 is supported on the vertically adjustable frame 292 for movement therewith by an annular support 302 which is bolted to the adjustable frame 292 and has the tubular column 290 projecting upwardly therethrough. A pair of mating thrust bearings 303 and 304 are connected to a drive hub flange 306 on the lower end of the hub 301 and to the annular support 302, respectively, thereby permitting rotation of the hub relative to the annular support 302. An S-shaped bracket 307 is bolted to the support 302 and projecting over the hub flange 306 prevents undue separation from occurring between the thrust bearings 303 and 304.

A tool supporting hub 308 is bolted to the upper end of the drive column 290 and has an upwardly projecting neck 309 rotatably received about a reduced diameter portion 311 of the stationary column 288. A vertically extending drive post 312 is bolted to the drive hub 301 and projects upwardly through a bushed drive block 313 that is rigid with the tool supporting hub 308. It will be recognized that the drive post 312 transmits rotary motion from the drive hub 301 to the tool supporting hub 308 yet permits vertical motion of the drive hub 301 and associated parts relative to the tool supporting hub 308.

A non-rotatable cam supporting hub 316 is keyed to the reduced diameter portion 311 of the stationary column 288 and has a threaded counterbore in its upper end which receives the threaded body of a height adjustment bushing 318. The bushing 318 includes a small diameter bore journaled on a small diameter portion 321 of the stationary column 288, and a large diameter bore journaled on the portion 311 of the shaft. A handle 323 screwed into the bushing 318 provides means for rotating the bushing and thereby raising or lowering the cam supporting hub 316 to the desired elevation. The cam supporting hub 316 is locked at the desired elevation by a threaded collar 324 which is screwed onto the small diameter portion 321 of the stationary column 288. A handle 326 is screwed into the collar 324 to provide means for readily locking the collar 324 against the bushing 318.

An annular cam 327 is bolted to the cam supporting hub 316 and includes a lower continuous vertical adjustment track 328 for controlling the upward vertical movement of the crimping heads 54, and an upper arcuate track segment 329 for assuring downward movement of the crimping heads 54 at the appropriate time. A pick-up finger cam segment 331 is bolted to the lower end of the annular cam 327.

Figure 7:
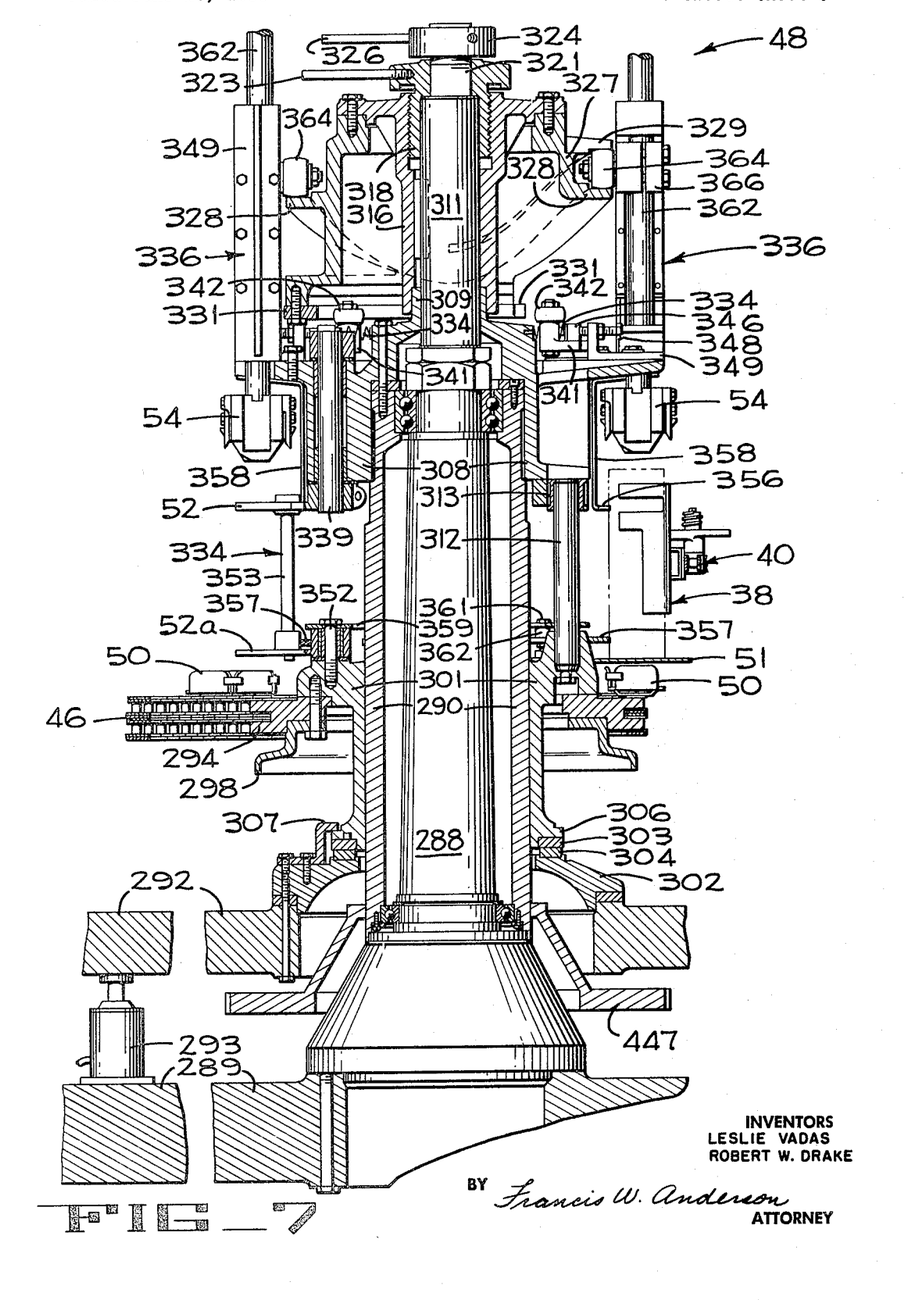
FIGURE 7 is an enlarged vertical central section taken along lines 7—7 of FIGURE 1 illustrating a crimping turret with a carton being transferred into one of the carriers as the carrier moves around the turret.

As indicated in FIGURES 1, and 7, the crimping turret 48 includes six evenly spaced identical carton transfer finger assemblies 334 which are associated with six identical crimping head assemblies 336. Since each assembly 334 and 336 are identical to the other five assemblies on the turret, only one of the carton transfer finger assemblies 334 and one of the crimping head assemblies 336 will be described in detail.

Each carton transfer finger assembly 334 comprises one of the aforementioned upper fingers 52 (FIG. 7) and lower fingers 52a. The upper finger 52 is rigidly connected to the lower end of a vertical shaft 339 which is journaled in the tool supporting hub 308 and has an actuating lever 341 keyed to its upper end. The actuating lever 341 has a cam follower 342 journaled on its free end and arranged to ride along the camming surface of the cam segment 331 as illustrated in FIGURE 7. The shaft 339 is pivotally urged in a counterclockwise direction by compression springs 344 (FIG. 7) which are disposed between a boss 346 formed on the lever 341 and the tool supporting hub 308. The maximum extent of counterclockwise pivotal movement of the shaft 339 is limited by abutment of the boss 346 against a cap screw 348 which is locked in adjusted position on the crimping head subframe 349.

The lower transfer finger 52a is pivotally mounted on a cap screw 352 (FIG. 7) which is screwed into the drive hub 301 and is concentric with the associated shaft 339. The upper finger 52 and the lower finger 52a are interconnected by a vertically extended rod 353 which is rigidly secured to the lower finger 52a and slidably received in the upper finger 52. Thus, the pivotal movement imparted to the upper finger 52 by the cam segment 331 will also be imparted to the lower finger 52a through the rod 353. Also, the rod may slide vertically relative to the upper finger 52 when the movable frame 292 is raised or lowered to accommodate the several sizes of cartons.

It will be understood that the cap screw 348 associated with each pick-up finger assembly 334 is locked in a position which will maintain carton engaging surfaces of the upper finger 52 and lower finger 52a in a vertical plane parallel with the trailing wall of the carrier 50 disposed therebelow as indicated in FIGURE 1.

Upper carton stop plates 356 and lower stop plates 357 prevent radial inward movement of the cartons during movement of the cartons along the arcuate path around the axis of the top crimping turret 48. The upper stop plates 356 are formed as flanges on the lower ends of brackets 358 that are bolted to the tool supported hub 308. The lower stop plates 357 are connected to an annular ring 359 by bolts 361 and cooperating spacers 362. The ring 359 is connected to the drive hub 301 by the cap screws 352.

Before the transport conveyor 46 moves tangentially away from the drive sprocket 294, the cam segment 331 (FIG. 7) engages the cam follower 342 causing the fingers 52 and 52a to pivot rearwardly away from the carton and to remain in this position until the carton has been advanced out of the crimping turret 48 by the transport conveyor 46.

Figure 8:
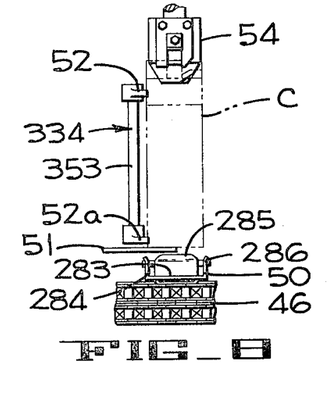
FIGURES 8 and 9 are operational views looking in the direction of arrows 8—8 of FIGURE 1 and illustrating the manner in which the carton is moved off the dead plate and pushed downwardly into one of the carriers.
Figure 9:
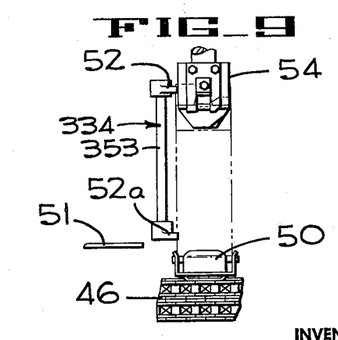

Each crimping head assembly 336 comprises a vertically reciprocable shaft 362 which is slidably received in one of the crimping head sub-frames 349 and has one of the crimping heads 54 rigidly secured to its lower end. A cam follower 364 is journalled on a split block 366 which is clamped on the shaft 362. The cam follower rides between the cam tracks 328 and 329 which lowers the head 54 into the carton before the carton moves off the dead plate 51 as indicated in FIGURE 8 and immediately after moving of the dead plate forces the carton downwardly into the associated carriers 50 as indicated in FIGURE 9.

Since the details of the crimping heads 54 form no part of the present invention, they will not be described in detail. These crimping heads are fully disclosed in the aforementioned Vadas et al. application, therefore reference may be had to said application for the details of the heads 54.

A drive mechanism 382 (FIG. 10) is provided in order to drive the bottom forming turret 22, the stripping mechanism 32 (FIG. 1), the transfer conveyor 40, the transport conveyor 46 and the top crimping turret 48 in timed relation with each other.

Figure 10:
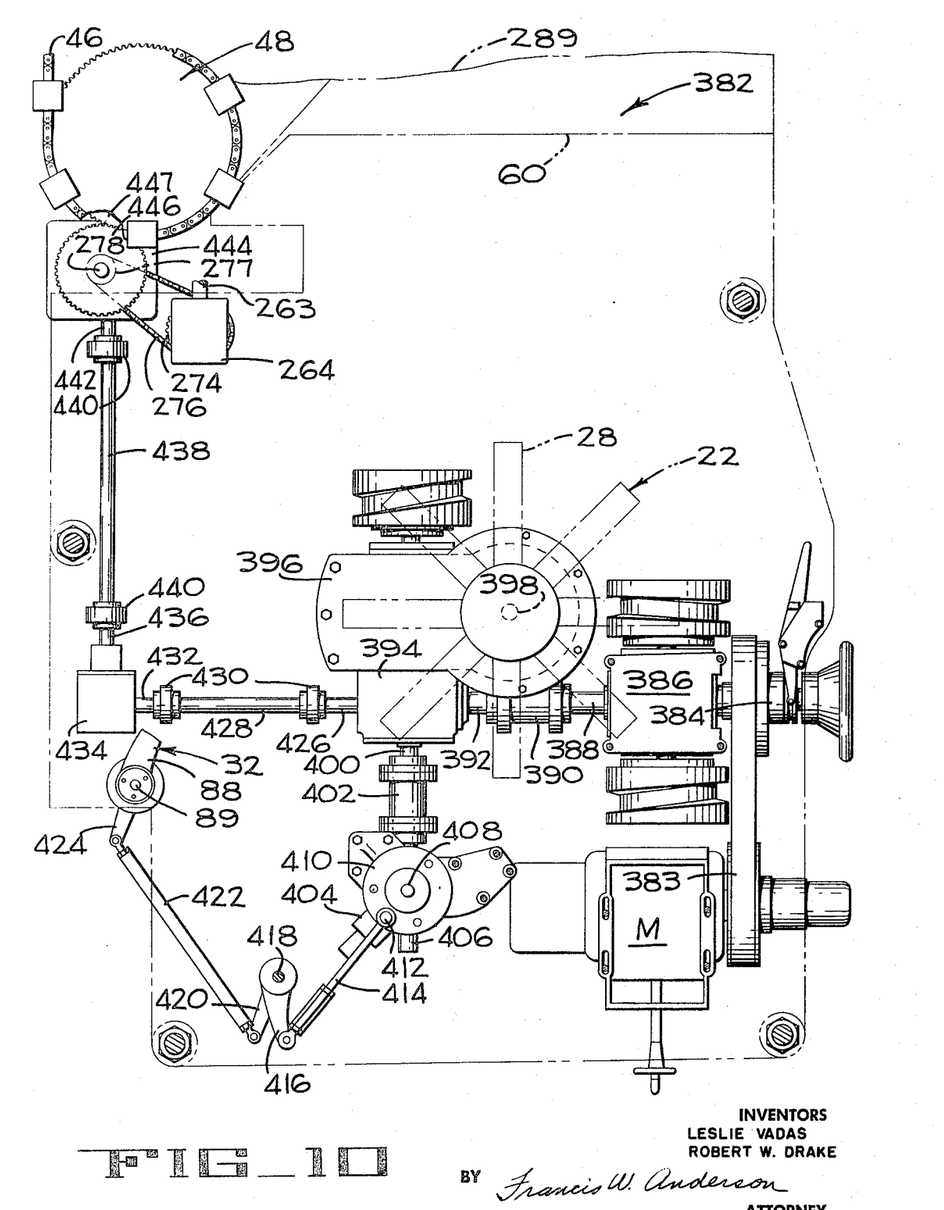
FIGURE 10 is a plan illustrating the drive for the transfer apparatus of the present invention.

The drive mechanism 382 comprises a variable speed motor M which is connected by a belt drive 383 to an overload clutch 384 such as a Maxitorq clutch Model No. 24, marketed by Carlyle Johnson Company, 52 Main Street, Manchester, Connecticut. The clutch 384 drives a gear reducer 386 having output shaft 388 connected by a flexible coupling 390 to the input shaft 392 of a gear box 394 of an intermittent driving unit 396, which drive unit includes a vertically extending intermittently driven shaft 398 to which the bottom forming turret 22 is connected.

A first continuously driven output shaft 400 of the gear box 394 is connected by a coupling 402 to a lower gear box 404 which is, in turn, coupled to an upper gear box 406 having an output shaft 408. A crank disc 410 is keyed to the output shaft 408 and has a crank pin 412 adjacent its periphery which pin is pivotally attached to one end of a link 414. The other end of the link 414 is pivotally connected to a lever 416 which is secured to the vertical shaft 418 pivoted in the frame 60. Another lever 420 is secured to the shaft 418 and has its free end pivotally connected to one end of a link 422. The other end of the link 422 is connected to a lever 424 which is secured to the aforementioned shaft 89. Thus, the carrier actuating arm 88 of the stripping mechanism 32 is oscillated causing the mandrel unloading carrier 61 to reciprocate thereby stripping cartons from the mandrels 28 in timed relation with the movement of the bottom forming turret 22 and placing the cartons in the troughs 34 at the mandrel unloading station 30.

A second continuously driven output shaft 426 of the gear box 394 is connected by a shaft 428 and couplings 430 to the input shaft 432 of a right angle gear box 434. The output shaft 436 of the gear box 434 is connected by a shaft 438 and couplings 440 to the input shaft 442 of a gear box 444 having the aforementioned vertical output shaft 278 extending upwardly therefrom. The output shaft 278 has the sprocket 277 that drives the transfer conveyor 40 keyed thereon.

A drive gear 446 is keyed to the shaft 278 and meshes with a large diameter gear 447 which is secured to the tubular drive column 290 of the crimping turret 48. Thus, the crimping turret 48 and transport conveyor 46 are continuously driven in timed relation with the turret 28, mandrel stripping mechanism 32 and transfer conveyor 40.

Although the operation of the carton transfer apparatus 20 of the present invention has been included with the above detailed description, a brief résumé of the operation will follow.

Pairs of cartons with their bottom closures sealed are intermittently indexed by the forming turret 22 (FIG. 1) into the mandrel unloading station 30. While indexed at station 30, the mandrel stripping mechanism 32 is reciprocated thereby stripping an upper and a lower carton from the upper and lower mandrels 28, depositing the cartons in the upper and lower troughs 34, and thereby permitting the turret 22 to index another pair of mandrels and cartons supported thereon into the unloading station 30.

The two cartons in the troughs 34 (FIG. 4) are simultaneously pushed transversely out of the troughs by the pusher 36 into the upwardly moving transfer jaws 38 of the transfer conveyor 40 which jaws at this time have their gripping fingers 42 held open by the cams 164 and 204. After moving past the cams 164 and 204 the carton gripping fingers are released so as to firmly engage the cartons which at this time are horizontally disposed.

The transfer conveyor 40 then carriers the cartons along a circuitous path at which time the cartons may be sterilized if desired. The cartons are subsequently shifted to a vertical position and are moved around the sprocket 254 into the linear portion 261 of the path of movement of the transfer conveyor 40, which linear portion is tangent to the path of movement of the carriers 50. While in the linear portion 261, the cartons are disposed above the dead plate 51, and are gradually moved into vertical alignment above the carriers 50. At the point of tangency the cartons are released by the jaws 38 and are engaged by the upper and lower transfer fingers 52 and 52a of the top crimping turret 48 which fingers stabilize the cartons. Shortly thereafter the crimping heads 54 (FIG. 7) are lowered into the cartons and push the cartons into the carriers shortly after the cartons move past the dead plate 51.

It will be particularly noted that the fingers 52 and 52a do not engage the cartons when the cartons are stationary, but engage the cartons when they are moving in the same direction but at a slightly slower speed than the tangential speed of the carriers 50. Although the ratio of the speed of the carriers 50 relative to the speed of the transfer jaws 38 in the preferred embodiment of the invention is 10:6 since the carrier spacing is ten inches and the jaw spacing is six inches, it will be appreciated that the two speeds will be identical if the carrier spacing and jaw spacing are identical. It will be understood that the drive mechanism may readily be adapted to drive the two conveyors at the same speed if the jaws and carriers are spaced equal distances apart, or may be adapted to drive the two conveyors at other speeds which are in direct proportion to the spacing between the jaws as compared to the spacing between the carriers.

From the foregoing description it is apparent that the carton transfer apparatus of the present invention includes transfer jaws carried by a transfer conveyor which firmly grip cartons and transfer the cartons from two rows spaced a predetermined distance apart, twists the cartons between a horizontal and a vertical position, and deposits the cartons on a dead plate in vertical alignment with carriers which are preferably spaced a different distance apart from said predetermined distance. The carriers are supported on a single transport conveyor and the transport conveyor and transfer conveyor are continuously driven at different speeds which are directly proportional to the spacing between the transfer jaws and the carriers.

While one embodiment of the present invention has been shown and described, it will be understood that changes and modifications may be made therein without departing from the spirit of the invention or the scope of the appended claims.

The present invention and the manner in which the same is to be used having thus been described, what is claimed as new and desired to be protected by Letters Patent is:

1. A carton transfer apparatus for elongated cartons comprising means for supporting a carton in a horizontal position with one end closed, unloading means for intermittently placing a carton in said support means at an unloading station, transfer conveying means movable along a path between a carton receiving position adjacent said supporting means at the unloading station and a tangential discharge portion, a plurality of carton gripping transfer jaws supported by said transfer conveying means, means for effecting the removal of the carton from said support means and for effecting gripping attachment of the carton in one of said jaws as said one jaw moves through said unloading station, means included in said transfer conveying means for shifting the carton from a horizontal to a vertical position while supported by said one transfer gripping jaw, a transport conveyor movable along an arcuate path which is tangent to said tangential portion of said path, a plurality of spaced carriers secured to said transfer conveyor, a dead plate disposed between one of said carriers and said one jaw at said point of tangency, said one carrier being disposed in vertical alignment with said one jaw and the carton at the point of tangency, drive means for driving said unloading means, said transfer conveying means, and said transport conveyor in timed relation, means for opening said one jaw at the point of tangency to release the carton from said one jaw for acceptance by said one carrier, and means for stabilizing the carton and moving the carton from the point of tangency off the dead plate into the carrier.

2. An apparatus according to claim 1 wherein said transfer jaws are spaced a predetermined distance apart and said carriers are spaced a different distance apart, and wherein said drive means continuously drives said transfer conveying means and said transport conveyor at speeds that are inversely proportional to the spacing between said jaws and said carriers.

3. An apparatus according to claim 2 wherein said transfer jaws are being moved faster than said carriers, said carriers each having a downstream wall, a turret of said stabilizing and carton moving means is formed concentric with said arcuate path of said transport conveyor and moves at the same speed as said transport conveyor, said turret carries pairs of upper and lower transfer fingers disposed above and in alignment with said downstream walls of said carriers when moving around said arcuate path of said transport conveyor, said pair of fingers above said one carrier arranged to engage one wall of the carton at said point of tangency so as to stabilize the upper end of the carton, and said jaws are slotted at a point in alignment with the upper one of said associated transfer fingers to permit said upper transfer finger to move at its faster rate through said slot thereby maintaining stabilizing control of the carton.

4. An apparatus according to claim 1 wherein means are provided for adjusting said carton transfer apparatus to handle cartons of different heights.

5. An apparatus according to claim 1 wherein said transfer conveying means is an endless transfer conveyor guided for movement around a circuitous path, and wherein said tangential portion of the path is horizontal and linear.

6. An apparatus according to claim 5 wherein said transfer conveyor is guided by a plurality of sprockets for arcuate movement in planes disposed at 90 degrees to each other.

7. An apparatus according to claim 1 wherein said supporting means is arranged to receive two cartons at a time from said unloading means and supports the two cartons spaced vertically from each other a distance equal to the spacing of said jaws, and wherein said means for effecting removal of the cartons from said support means is a reciprocating pusher which simultaneously moves two cartons from said support means into adjacent ones of said carriers in timed relation with the movement of said carriers.

8. An apparatus according to claim 7 wherein said transfer jaws are spaced a predetermined distance apart and said carriers are spaced a different distance apart, and wherein said drive means continuously drives said transfer conveying means and said transport conveyor at speeds that are inversely proportional to the spacing between said jaws and said carriers.

9. An apparatus according to claim 7 wherein said transfer conveying means comprises a plurality of links pivotally connected to each other about pivot pins at opposite ends of each link which pins are disposed at 90 degrees to each other; wherein each of said transfer jaws comprises an angle body rigidly secured to said one of said links, a gripping finger pivotally mounted on said one of said pivot pins, resilient means connected between said finger and said one pin for urging said finger into gripping engagement with the carton, and means defining a slot in said body; wherein said transfer jaws are being moved slower than said carriers, said carriers each having a downstream wall; and a turret of said stabilizing and carton moving means is formed concentric with said arcuate path of said transport conveyor and moves at the same speed as said transport conveyor, said turret carries pairs of upper and lower transfer fingers disposed above and in alignment with said downstream walls of said carriers when moving around said arcuate path, said pair of transfer fingers above said one carrier arranged to engage one wall of the carton at said point of tangency so as to stabilize the upper end of the carton and to move said carton off said dead plate, said upper one of said associated transfer fingers being in alignment with said slot to permit said upper finger to move at its faster rate through said slot thereby maintaining stabilizing control of the transferred carton, and a vertically reciprocable crimping head supported by said turret and movable into the upper end of the carton prior to its movement off said dead plate and thereafter effective to force the carton into said one carrier.

10. An apparatus according to claim 1 wherein said carriers each have a downstream wall, and wherein said stabilizing and carton moving means is a turret formed concentric with said arcuate path of said transport conveyor and moving at the same speed as said transport conveyor, and said turret includes pairs of upper and lower transfer fingers disposed above and in alignment with associated ones of said downstream walls of said carriers when moving around said arcuate path, said pair of fingers above said one carrier arranged to engage one wall of the carton at said point of tangency so as to stabilize the upper end of the carton.

References Cited by the Examiner
UNITED STATES PATENTS

| | | | |
|---|---|---|---|
| 1,862,360 | 6/1932 | Forte | 198—24 |
| 2,335,239 | 11/1943 | Gladfelter et al. | 198—25 |
| 3,252,384 | 5/1966 | Beert et al. | 198—33 |

EVON C. BLUNK, *Primary Examiner.*

M. L. AJEMAN, *Assistant Examiner.*